United States Patent
Zeidlhofer et al.

(10) Patent No.: US 11,312,052 B2
(45) Date of Patent: Apr. 26, 2022

(54) PROCESS FOR PRODUCING A MOLDED PART

(71) Applicant: ENGEL AUSTRIA GmbH, Schwertberg (AT)

(72) Inventors: Herbert Zeidlhofer, Haag (AT); Guenther Klammer, Aschbach Markt (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 40 days.

(21) Appl. No.: 16/037,592

(22) Filed: Jul. 17, 2018

(65) Prior Publication Data
US 2019/0022908 A1  Jan. 24, 2019

(30) Foreign Application Priority Data
Jul. 20, 2017  (AT) .............................. A 50605/2017

(51) Int. Cl.
*B29C 45/56* (2006.01)
*B29C 45/26* (2006.01)
*B29C 45/67* (2006.01)

(52) U.S. Cl.
CPC ............ *B29C 45/56* (2013.01); *B29C 45/26* (2013.01); *B29C 45/67* (2013.01); *B29C 2045/5695* (2013.01)

(58) Field of Classification Search
CPC ........ B29C 2045/5695; B29C 45/0003; B29C 45/56; B29C 2045/563; B29C 2045/569
See application file for complete search history.

(56) References Cited

U.S. PATENT DOCUMENTS 3,909,169 A * 9/1975 Barrie ................. B29C 45/1642
4,781,573 A * 11/1988 Depreter ................. B29C 45/56
425/577

(Continued)

FOREIGN PATENT DOCUMENTS

DE  10 2012 005 268  10/2012
JP  55-77545  6/1980

(Continued)

OTHER PUBLICATIONS

Advanced CAE Technology. "C-MOLD Co-Injection:" Wayback Machine, 1996, web.archive.org/web/20160218021043/www.dc. engr.scu.edu/cmdoc/fp_doc/f5co1.frm.html. (Year: 1996).*

(Continued)

*Primary Examiner* — Kelly M Gambetta
*Assistant Examiner* — Andrés E. Behrens, Jr.
(74) *Attorney, Agent, or Firm* — Wenderoth, Lind & Ponack, L.L.P.

(57) ABSTRACT

A method of manufacturing a molded part includes inserting melt into a cavity of a first tool part, and the first tool part and a second tool part are moved away from one another during or after the insertion of the melt by moving a second mold clamping plate relative to a first mold clamping plate such that in the first tool part or in the second tool part clearance space of a first or second cavity portion of the cavity is created, and a gap is formed between the first tool part and the second tool part. Melt is further inserted into the clearance space of the cavity, and the gap is bridged by an at least already partially solidified section of the melt. A holding force is transmitted from the second tool part to the first tool part through the partially solidified section of the melt bridging the gap.

23 Claims, 5 Drawing Sheets

(56) References Cited

U.S. PATENT DOCUMENTS

| | | | |
|---|---|---|---|
| 5,965,081 A * | 10/1999 | Schloss | B29C 45/1684 264/255 |
| 6,149,420 A * | 11/2000 | Kim | B29C 33/424 249/103 |
| 7,029,263 B2 * | 4/2006 | Burkle | B29C 45/54 425/208 |
| 7,871,261 B2 * | 1/2011 | Steiner | B29C 45/56 425/577 |
| 7,910,044 B2 * | 3/2011 | Steiner | B29C 45/56 264/328.7 |
| 7,981,334 B2 * | 7/2011 | Chiang | B29C 45/768 264/40.5 |
| 9,662,817 B2 | 5/2017 | Montes De Oca Balderas et al. | |
| 10,357,905 B2 * | 7/2019 | Stigsson | B29C 35/0222 |
| 10,589,450 B2 * | 3/2020 | Pillwein | G01N 33/44 |
| 10,875,224 B2 * | 12/2020 | Montes De Oca Balderas | B29C 45/261 |
| 2007/0264378 A1 | 11/2007 | Schwaighofer et al. | |
| 2008/0251963 A1 * | 10/2008 | Steiner | B29C 45/56 264/151 |
| 2008/0292738 A1 * | 11/2008 | Cude | B29C 45/80 425/150 |
| 2009/0304843 A1 * | 12/2009 | Steiner | B29C 45/0003 425/184 |
| 2010/0193990 A1 * | 8/2010 | Privan | B29C 45/0003 |
| 2010/0221500 A1 * | 9/2010 | Steiner | B29C 45/56 428/174 |
| 2015/0273747 A1 | 10/2015 | Montes De Oca Balderas et al. | |
| 2015/0352761 A1 * | 12/2015 | Okamoto | B29C 45/1635 |
| 2017/0252955 A1 * | 9/2017 | Link | B29C 45/6728 |
| 2019/0091906 A1 * | 3/2019 | Bopp | B29C 45/26 |
| 2021/0023755 A1 * | 1/2021 | Montes De Oca Balderas | B29C 45/56 |

FOREIGN PATENT DOCUMENTS

| | | | | |
|---|---|---|---|---|
| JP | 56-99644 | | 8/1981 | |
| JP | 9-174631 | | 7/1997 | |
| JP | 2014/173063 | * | 3/2013 | B29C 45/14 |
| WO | 2014/052770 | | 4/2014 | |
| WO | 2017/038992 | | 3/2017 | |
| WO | 2017/039992 | | 3/2017 | |

OTHER PUBLICATIONS

JP-2014/173,063 (Fujiura) Mar. 2013 (online machine translation), [Retrieved on Sep. 28, 2020], Retrieved from: Espacenet (Year: 2013).*

* cited by examiner

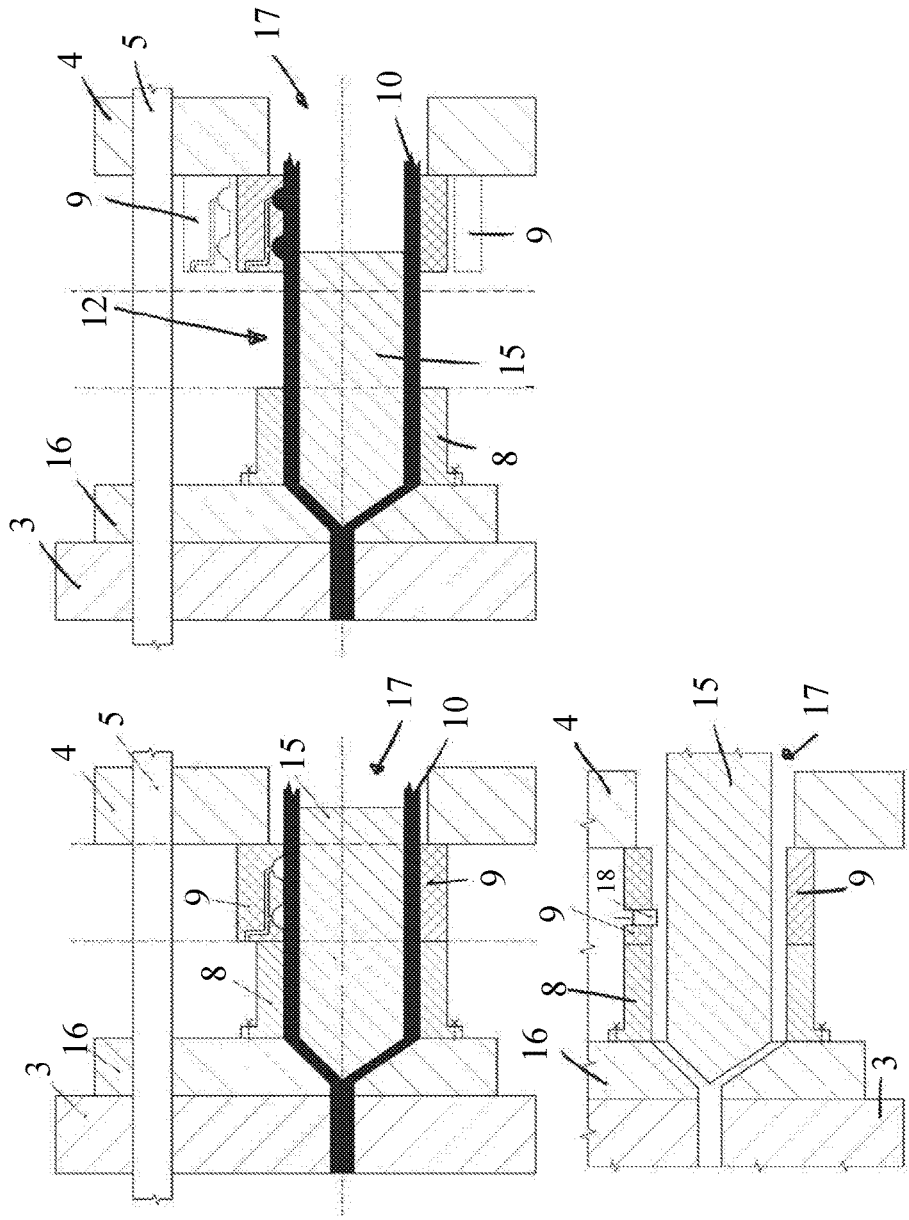

PROCESS FOR PRODUCING A MOLDED PART

BACKGROUND OF THE INVENTION

The invention concerns a method to manufacture a molded part.

In a generic method, a problem can arise that a molded part is to be produced, which requires a mass of melt exceeding a provided quantity that is supplied under one time by an injection unit of the molding machine. In order to solve this problem, it is known that the required amount of melt is inserted sequentially into the cavity by portion amounts, and the cavity for this purpose can be increased. The single portion amounts of melt can be provided successively by a single injection unit or several injection units. For this purpose, shear edge tools have also become known. However, the dimensions of the molded part produced in this way are, of course, limited by the maximum enlargeability of the cavity, as a holding force has to be transferred between the mold parts in order to prevent melt from escaping from the cavity.

SUMMARY OF THE INVENTION

The object of the invention is to provide a generic method in which the above-mentioned limitation is overcome.

According to the invention, a gap is bridged by an at least already partially solidified section of the melt, and a holding force is transferred from the second tool part through the at least already partially solidified section of the melt, bridging the gap to the first tool part. Therefore, the limitation is eliminated by the maximum enlargeability of the cavity.

The first and second molded parts are moved away from each other by moving the second mold clamping plate relative to the first mold clamping plate.

Preferably, the molding machine is an injection molding machine, and the method for producing the molded part is an injection molding method. The melt is preferably a melt of, for example, thermoplastic material.

In contrast to an extrusion method, preferably the injection unit (or, if several injection units are provided, each of them separately) operates discontinuously. Of course, it is also possible to provide continuously operating injection units.

Of course, it would be possible to provide a cover bridging the gap between the first and second tool part. This cover can be made out of one piece with the first or second tool part, or connected to the first and second tool part. However, no holding force is transmitted through this cover. Whether with or without the cover, the holding force is transmitted, at least partially, and preferably exclusively, via the section of the melt between the tool parts that bridges the gap, and is at least already partially solidified.

The tool parts can have guides. In this case, there is no need for a guide of the movable mold clamping plate on the machine frame.

It is preferred to move the first tool part and the second tool part away from each other in a parallelism-controlled manner. This is particularly indicated if the cavity is asymmetrically shaped relative to the machine's longitudinal axis in such a way that there is no symmetrical swelling force relative to the machine's longitudinal axis.

A molded part of any desired length—endless, so to speak—can be produced if a holding device is provided for the already solidified section of the injection-molded part, which supports it. It may be necessary to provide a passage opening in the second mold clamping plate through which the already solidified part of the molded part can pass through. The holding device can, but does not have to, be provided separately from the tool. In other words, the holding device can be formed wholly or partially by elements of the first and/or second tool part.

It may be intended to vary the holding force over time, depending on a momentary cross-section of the solidified section of the injection molded part.

With respect to a possible embodiment, additional force transmission elements are provided for partial transmission of the holding force, so that the holding force does not have to be transmitted completely over the at least already partly solidified section of the melt.

BRIEF DESCRIPTION OF THE DRAWINGS

Embodiments of the invention are discussed on the basis of the drawings, in which:

FIG. 5a-c is a partial view of a fourth molding machine for producing molded parts unlimited in length.

DETAILED DESCRIPTION OF THE INVENTION

Figure 1:
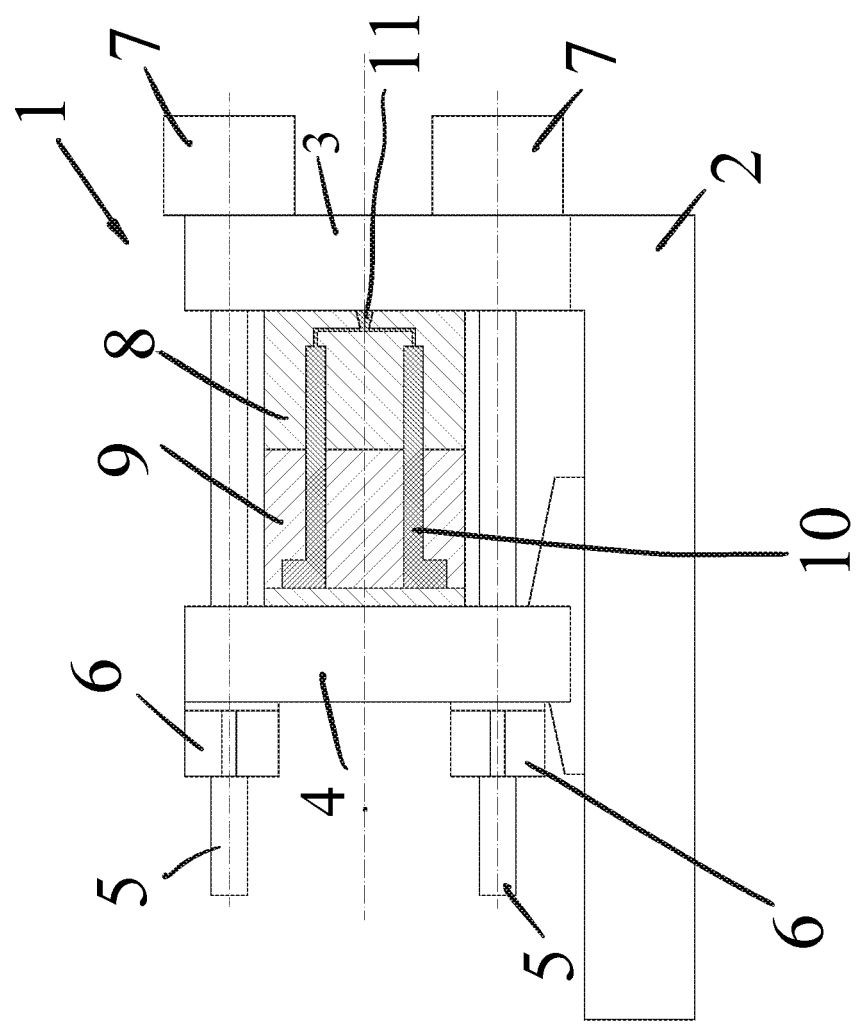
FIG. 1 shows a first molding machine after the insertion of a first amount of melt.

FIG. 1 shows a clamping unit 1 of a molding machine (here: two-plates injection molding machine) with a machine bed 2, a first mold clamping plate 3 fixed to the machine bed 2, and a second mold clamping plate 4 movable on the machine bed 2. In this embodiment, a cavity arranged around the machine's longitudinal axis is formed between a first tool part 8, arranged on the first mold clamping plate 3, and a second tool part 9, arranged on the second mold clamping plate 4. As shown in FIG. 1, a mold parting plane is formed between the first tool part 8 and the second tool part 9 along which a gap 12 can be formed as discussed below.

The method of the second mold clamping plate 4 can be performed by a rapid stroke mechanism, which is not shown because it is prior art. A holding force, which counteracts a swelling force exerted by the melt on the cavity, can be exerted on tie bars 5 by pressure pads 7, and on the second mold clamping plate 4 by the locking device 6 (here, split locking nuts known per se).

Figure 2:
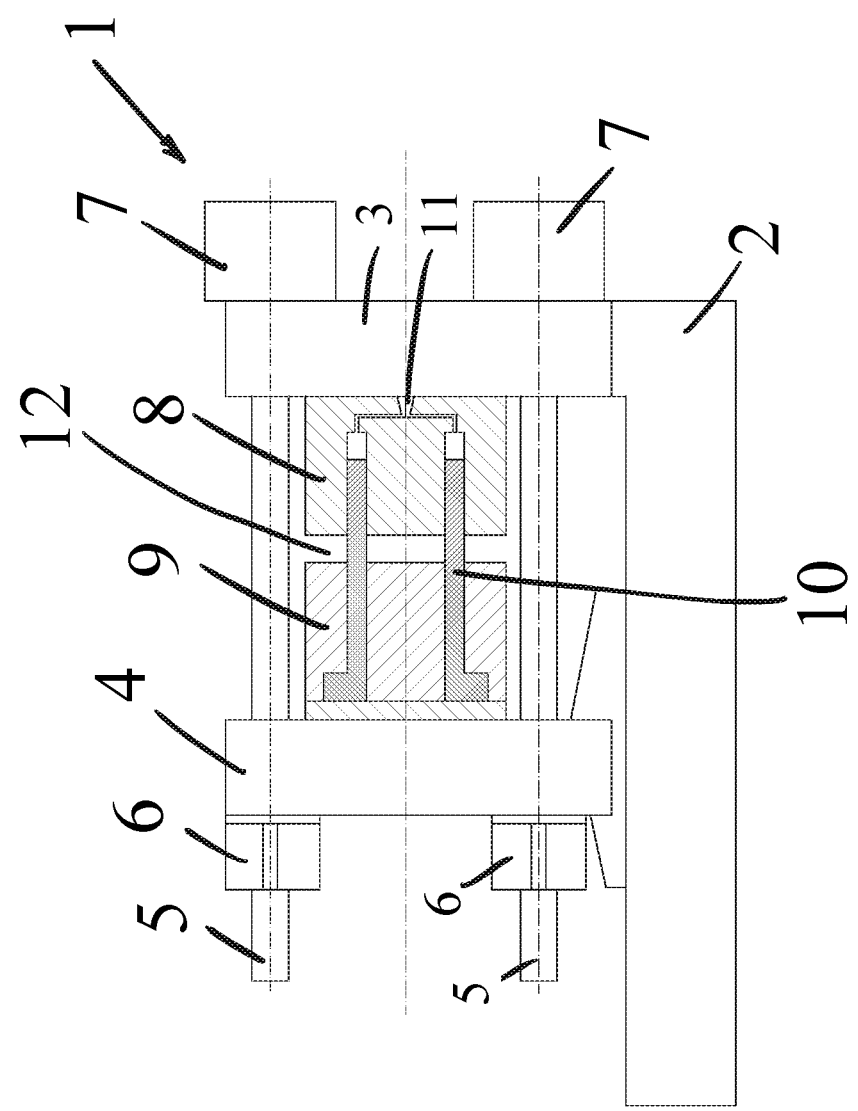
FIG. 2 shows the molding machine shown in FIG. 1 after the first and second tool halves have been moved so far apart from each other that a gap is formed in between them.

In the state shown in FIG. 1, a first amount of melt was inserted into the cavity via an injection unit 13, which is not shown (but see FIGS. 3 and 4), and fills it completely. If the first amount of melt were to solidify in this state, the dimensioning of the injection-molded part 10 shown would correspond to the dimensioning of the final molding part. However, according to the invention, the second mold clamping plate 4, and with it, the second tool part 9, are now moved away from the first mold clamping plate 3, and thus from the first tool part 8. As a result, a gap 12 is formed between the first and second tool parts 8, 9, the size of which is limited by the maximum stroke of the pressure pads 7. In addition, as also shown in FIG. 2, a clearance space is formed within one of a first cavity portion of the first tool part 8 or a second cavity portion of the second tool part 9 (here, the clearance space is formed in the first cavity portion of the first tool part 8).

The moving away can take place either with the locking device 6 closed or with it open.

Of course, the movement away can only take place when the first amount of melt has solidified at least to such an extent that it can bridge the gap 12 with the sufficiently solidified section, and can transfer holding force at least partially.

During the injection of a second amount of melt into the clearance space, the holding force generated by the pressure pad 7 is transmitted through the sufficiently solidified section of the first amount of melt forming the injection molded part 10. After reaching the maximum stroke of the pressure pads 7, the tie bars 5 are moved so far by the pressure pads 7 that the stroke of the pressure pads 7 is available again. If the locking device 6 was open, it is closed, and the second amount of melt is inserted into the clearance space of the cavity, which here is formed exclusively in the first tool part 8. This process can be repeated until the end of the lockable area of the tie bars 5 is reached. Then the molded part is produced with its maximum possible dimensioning.

Figure 3:
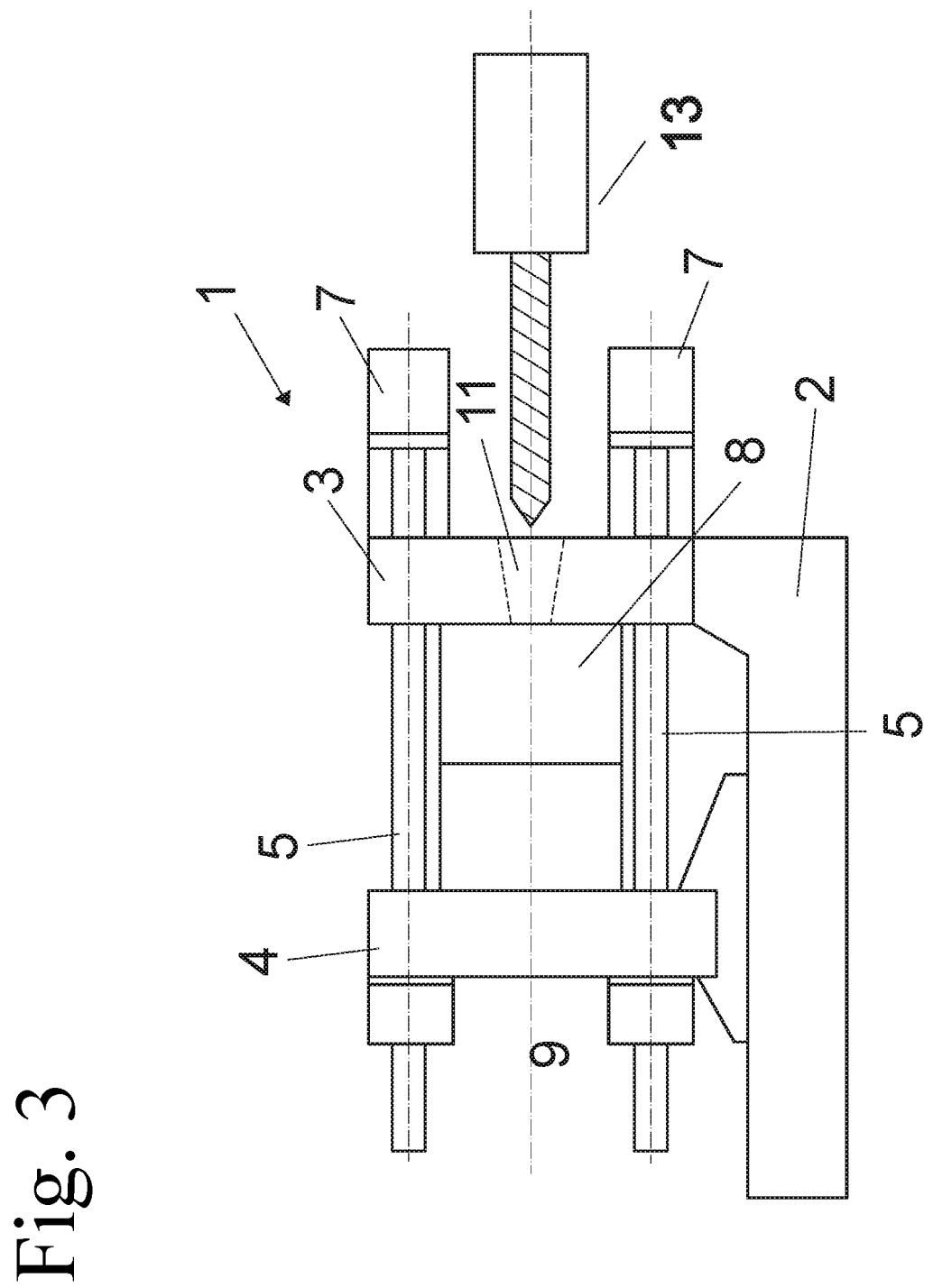
FIG. 3 shows a second molding machine before the insertion of a first amount of melt.

In contrast to the clamping unit 1 shown in FIGS. 1 and 2, the clamping unit 1 shown in FIG. 3 does not have a separate locking device 6, but the pistons of the pressure pads 7 can be moved continuously in the cylinders. Here, the maximum dimensioning of the molded part is limited by the maximum stroke of the pressure pads 7. The pressure pads 7 can be used here, both, for the rapid stroke and for the application of the holding force.

Figure 4:
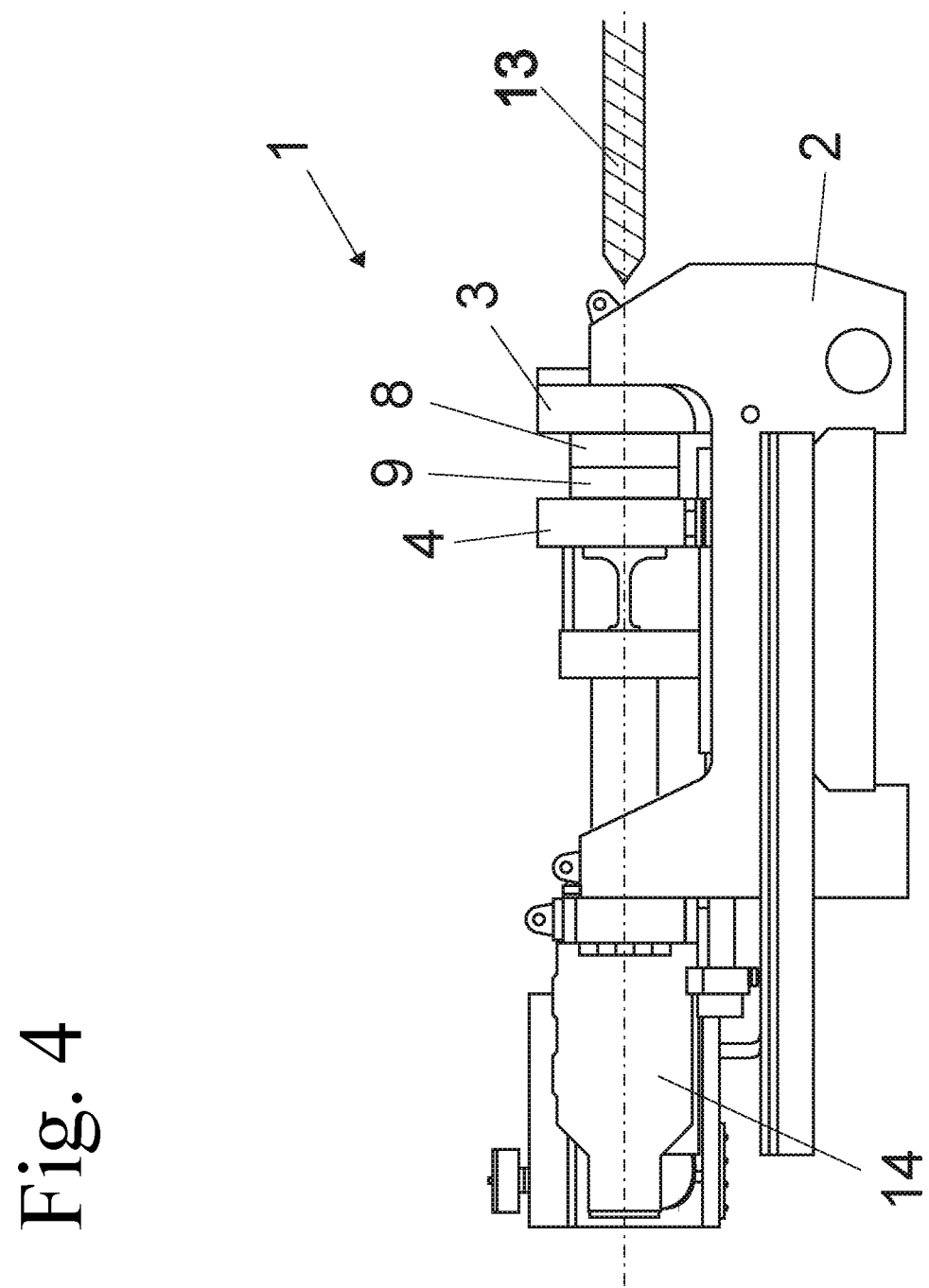
FIG. 4 shows a third molding machine before the insertion of a first amount of melt.

In the clamping unit 1 shown in FIG. 4, a central piston-cylinder unit 14 is provided for moving the second mold clamping plate 4, and for applying the holding force. Here, the maximum dimensioning of the molded part is limited by the maximum stroke of the piston-cylinder unit 14.

The embodiment shown in FIG. 5 allows the production of endless molded parts. For this purpose, a holding device 15 is provided, which holds the injection molded part 10. In this embodiment, the holding device 15 is designed as a mandrel. The holding device 15 is attached to the first mold clamping plate 3 via the first tool part 8 and/or the melt distributor 16.

The tool shown with a first tool part 8 and a second tool part 9 is used as an example for producing formed tubes with straps, beads, ribs or elements that generally deviate from the contour.

A melt distributor 16 is arranged on the first mold clamping plate 3. The melt distributor 16 distributes melt provided by an injection unit 13 (not shown) around the entire circumference of that part of the cavity which is formed in the first tool part 8. In this embodiment, the second tool part 9 has a horizontal parting plane, relative to which the second tool part 9 formed here in the form of two jaws can be opened (in general, the second tool part 9, for example, consists of at least two parts that can be moved away from each other).

The first and second tool parts 8, 9 are completely filled with melt in the position of the second mold clamping plate 4 shown in FIG. 5*a*, relative to the first mold clamping plate 3. Injection continues while the second mold clamping plate 4 is moved away from the first mold clamping plate 3 at a speed, the speed being open loop-controlled or closed loop-controlled, resulting in an increasing gap 12 between the first tool part 8 and the second tool part 9. The speed at which the second mold clamping plate 4 is moved away from the first mold clamping plate 3 is preferably open loop-controlled or closed loop-controlled in such a way that the filling of the cavity is guaranteed. The closed loop-control is preferably force-controlled.

Optional temperature control of tool parts 8, 9 ensures that the melt is sufficiently solidified before it leaves the cavity.

After reaching the end position of the second mold clamping plate 4 relative to the first mold clamping plate 3 as shown in FIG. 5*b*, the injection process is interrupted. The second tool part 9 is opened, and the second mold clamping plate 4 is moved back to the position shown in FIG. 5*a*. The already solidified section of melt passes through a passage opening 17 arranged in the second mold clamping plate 4. The injection process is continued until either the molded part with the desired length is produced, or the second mold clamping plate 4 returns to the position shown in FIG. 5*b*. If the desired length of the molded part is still not reached, the process is repeated until the desired length of the molded part is reached.

The parts of the second tool part 9 can be designed in such a way that they prevent the injection-molded part from advancing by frictional connection, so that the latter can be determined purely by the movement of the second mold clamping plate 4.

The parts of the second tool part 9 can be provided with additional cast-on elements for producing a form-fit with the solidified section of the melt (see FIG. 5*b*).

In FIG. 5*b* it can be seen that the upper part of the second tool part 9 is provided with a runner, and—if this is desired—can be supplied with melt via its own injection unit 13. This additional cavity can be used, for example, to injection-form surface structures, such as ribs, onto the part.

The parts of the second tool part 9 can be provided with sliders 18, which can press into the melt in order to achieve a form-fit with it.

The sprues of the molded part can be injected by a separate injection point or by a valve.

A trimming device (e.g. cutting device) can be provided for trimming the molded part, and the trimming can take place, for example, at regular time intervals. The trimming device can be arranged, for example, between tool parts 8, 9.

LIST OF REFERENCE SIGNS

1 clamping unit of a molding machine
2 machine bed
3 first mold clamping plate
4 second mold clamping plate
5 tie bar
6 locking device
7 pressure pad
8 first tool part
9 second tool part
10 injection-molded part
11 sprue
12 gap
13 injection unit
14 piston-cylinder unit
15 holding device
16 melt distributor
17 passage opening in the second mold clamping plate
18 slider

The invention claimed is:

1. A method of producing a molded part, comprising:
   supplying a first amount of melt into a cavity of a molding tool, the molding tool comprising a first tool part mounted to a first mold clamping plate, and a second tool part mounted to a second mold clamping plate, the second mold clamping plate being movable relative to the first mold clamping plate, the cavity having a first cavity portion in the first tool part and a second cavity portion in the second tool part, and the molding tool being configured to open and close the cavity by allowing the second mold clamping plate to move relative to the first mold clamping plate;

during or after supplying the first amount of melt into the cavity, moving the first tool part and the second tool part away from each other by moving the second mold clamping plate relative to the first mold clamping plate to form (i) a clearance space in one of the first cavity portion and the second cavity portion, and (ii) a gap between the first tool part and the second tool part, the gap extending parallel to a first parting face of the first tool part and a second parting face of the second tool part so as to extend an entire length of each of the first parting face and the second parting face, the first parting face abutting the second parting face when the supplying of the first amount of melt into the cavity is started; and after moving the first tool part and the second tool part away from each other, supplying a second amount of melt into the clearance space of the one of the first cavity portion and the second cavity portion, wherein, after moving the first tool part and the second tool part away from each other, the gap is bridged by an at least partially solidified section of the first amount of melt, and a holding force is transmitted from the second tool part to the first tool part through the at least partially solidified section of the first amount of melt bridging the gap.

2. The method according to claim 1, wherein the molding tool further comprises tie bars and pressure pads to exert a pressure on the tie bars, the tie bars and pressure pads being configured to apply a holding force to the second mold clamping plate relative to the first mold clamping plate, the pressure pads having a stroke, and the gap being formed by a stroke movement of the pressure pads or by a rapid-stroke mechanism.

3. The method according to claim 2, further comprising, after supplying the first amount of melt:
locking the tie bars relative to the second mold clamping plate using a locking device;
opening the locking device after the stroke of the pressure pads has been complete;
moving the tie bars by the pressure pads so that the stroke of the pressure pads is available again;
closing the locking device; and
supplying the second amount of melt into the clearance space of the cavity.

4. The method according to claim 1, wherein the molding tool further comprises a holding device for holding the molded part, and a solidified section of the molded part passes through a passage opening in the second mold clamping plate.

5. The method according to claim 1, wherein the moving of the first tool part and the second tool part away from each other is performed in a parallelism-controlled manner.

6. The method according to claim 1, wherein the molding tool further comprises a piston-cylinder unit for moving the second mold clamping plate relative to the first mold clamping plate, the gap being formed by a stroke movement of the piston-cylinder unit.

7. The method according to claim 1, wherein the molding tool further comprises only one injection unit for supplying both the first amount of melt and the second amount of melt into the cavity.

8. The method according to claim 7, further comprising operating the only one injection unit discontinuously.

9. The method according to claim 1, wherein the molding tool further comprises a plurality of injection units for supplying the first amount of melt and the second amount of melt into the cavity.

10. The method according to claim 1, wherein the molding tool further comprises pressure pads to exert the holding force, the holding force being transmitted from the second tool part to the first tool part through the pressure pads and the at least partially solidified section of the melt bridging the gap.

11. A method of producing a molded part, comprising:
supplying a first amount of melt into a cavity of a molding tool, the molding tool comprising a first tool part mounted to a first mold clamping plate, and a second tool part mounted to a second mold clamping plate, the molding tool having a mold parting plane formed between the first tool part and the second tool part, the second mold clamping plate being movable relative to the first mold clamping plate in a direction perpendicular to the mold parting plane, the cavity having a first cavity portion in the first tool part and a second cavity portion in the second tool part, and the molding tool being configured to open and close the cavity by allowing the second mold clamping plate to move relative to the first mold clamping plate;

during or after supplying the first amount of melt into the cavity, moving the first tool part and the second tool part away from each other in the direction perpendicular to the mold parting plane by moving the second mold clamping plate relative to the first mold clamping plate to form (i) a clearance space in one of the first cavity portion and the second cavity portion, and (ii) a gap between the first tool part and the second tool part, the gap extending parallel to a first parting face of the first tool part and a second parting face of the second tool part so as to extend an entire length of each of the first parting face and the second parting face, the first parting face abutting the second parting face to form the mold parting plane when the supplying of the first amount of melt into the cavity is started; and after moving the first tool part and the second tool part away from each other, supplying a second amount of melt into the clearance space of the one of the first cavity portion and the second cavity portion, wherein, after moving the first tool part and the second tool part away from each other, the gap is bridged by an at least partially solidified section of the first amount of melt.

12. The method according to claim 11, wherein the molding tool further comprises a holding device for holding the molded part, and a solidified section of the molded part passes through a passage opening in the second mold clamping plate.

13. The method according to claim 11, wherein the moving of the first tool part and the second tool part away from each other in the direction perpendicular to the mold parting plane is performed in a parallelism-controlled manner.

14. The method according to claim 11, wherein the molding tool further comprises a piston-cylinder unit for moving the second mold clamping plate relative to the first mold clamping plate in the direction perpendicular to the mold parting plane, the gap being formed by a stroke movement of the piston-cylinder unit.

15. The method according to claim 11, wherein the molding tool further comprises pressure pads to exert the holding force in the direction perpendicular to the mold parting plane, the holding force being transmitted from the second tool part to the first tool part through the pressure pads and the at least partially solidified section of the melt bridging the gap.

16. A method of producing a molded part, comprising:
supplying a first amount of melt into a cavity of a molding tool, the molding tool comprising a first tool part mounted to a first mold clamping plate, and a second tool part mounted to a second mold clamping plate, the second mold clamping plate being movable relative to the first mold clamping plate, the cavity having a first cavity portion in the first tool part and a second cavity portion in the second tool part, and the molding tool being configured to open and close the cavity by allowing the second mold clamping plate to move relative to the first mold clamping plate;
during or after supplying the first amount of melt into the cavity, moving the first tool part and the second tool part away from each other by moving the second mold clamping plate relative to the first mold clamping plate to form (i) a clearance space in one of the first cavity portion and the second cavity portion, and (ii) a gap between the first tool part and the second tool part, the gap extending parallel to a first parting face of the first tool part and a second parting face of the second tool part so as to extend an entire length of each of the first parting face and the second parting face, the first parting face abutting the second parting face when the supplying of the first amount of melt into the cavity is started; and
after moving the first tool part and the second tool part away from each other, supplying a second amount of melt into the clearance space of the one of the first cavity portion and the second cavity portion,
wherein, after moving the first tool part and the second tool part away from each other, the gap is bridged only by an at least partially solidified section of the first amount of melt.

17. The method according to claim 16, wherein the molding tool further comprises a holding device for holding the molded part, and a solidified section of the molded part passes through a passage opening in the second mold clamping plate.

18. The method according to claim 16, wherein the moving comprises moving the first tool part and the second tool part away from each other in a direction perpendicular to the mold parting plane in a parallelism-controlled manner.

19. The method according to claim 16, wherein the molding tool further comprises a piston-cylinder unit for moving the second mold clamping plate relative to the first mold clamping plate in a direction perpendicular to the mold parting plane, the gap being formed by a stroke movement of the piston-cylinder unit.

20. The method according to claim 16, wherein the molding tool further comprises pressure pads to exert the holding force in a direction perpendicular to the mold parting plane, the holding force being transmitted from the second tool part to the first tool part through the pressure pads and the at least partially solidified section of the melt bridging the gap.

21. The method according to claim 1, wherein the clearance space and the gap formed by moving the first tool part and the second tool part away from each other are separate and spaced apart from each other.

22. The method according to claim 11, wherein the clearance space and the gap formed by moving the first tool part and the second tool part away from each other are separate and spaced apart from each other.

23. The method according to claim 16, wherein the clearance space and the gap formed by moving the first tool part and the second tool part away from each other are separate and spaced apart from each other.

* * * * *